No. 764,780. Patented July 12, 1904.

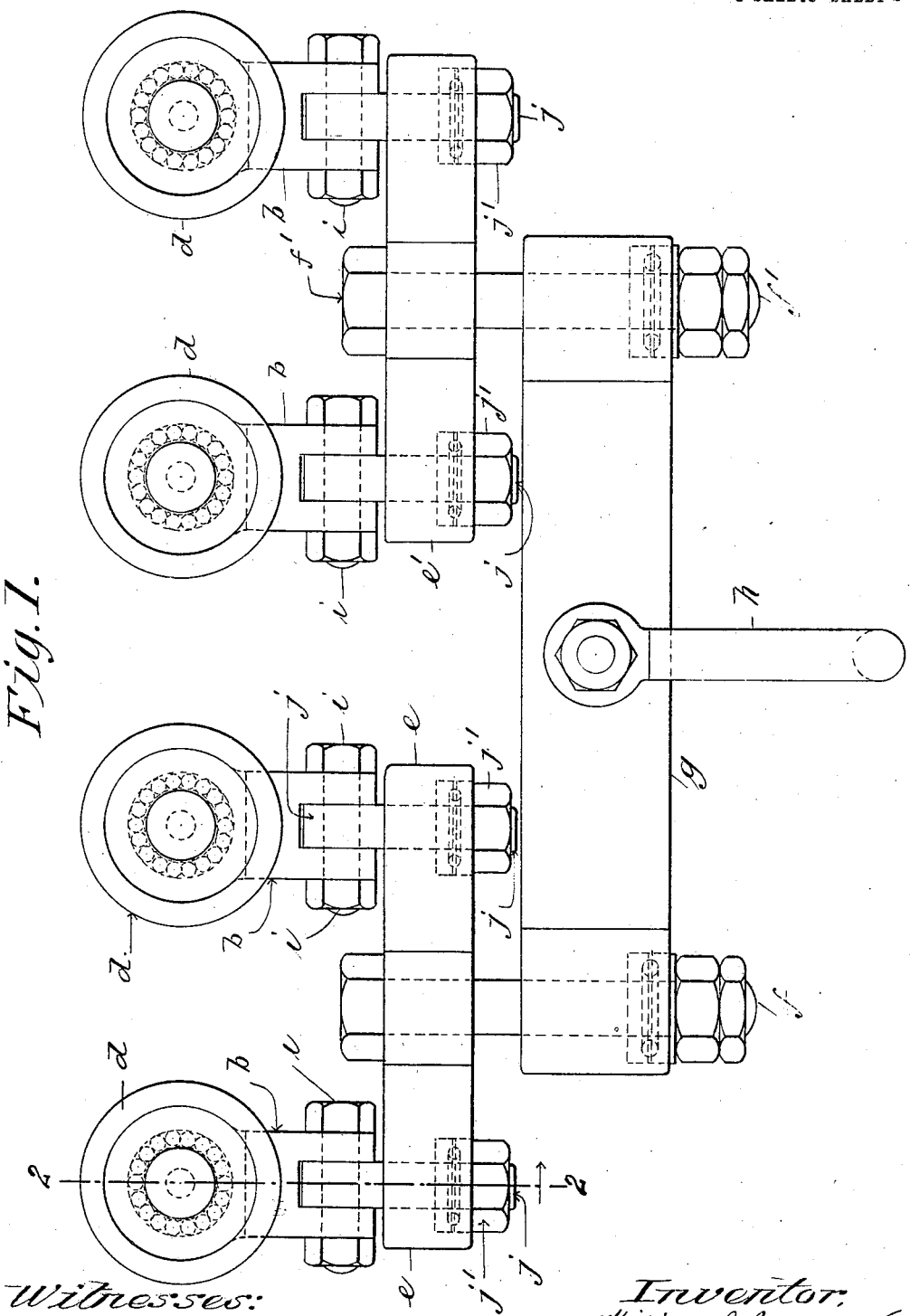

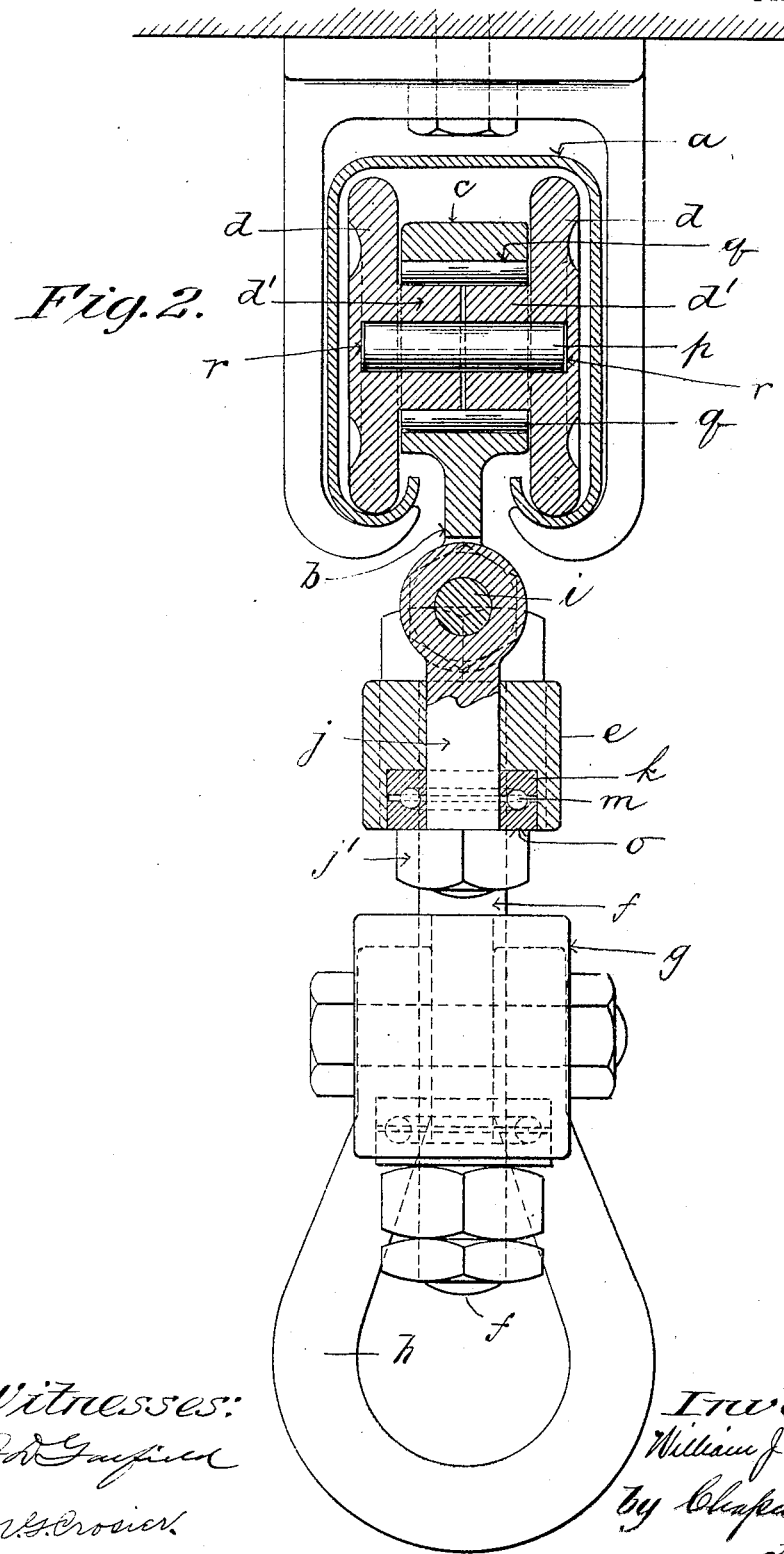

UNITED STATES PATENT OFFICE.

WILLIAM J. SUMNER, OF HOLYOKE, MASSACHUSETTS, ASSIGNOR TO COBURN TROLLEY TRACK MANUFACTURING COMPANY, OF WILLIMANSETT, MASSACHUSETTS, A CORPORATION.

TROLLEY FOR OVERHEAD TRACKS.

SPECIFICATION forming part of Letters Patent No. 764,780, dated July 12, 1904.

Application filed February 6, 1904. Serial No. 192,351. (No model.)

*To all whom it may concern:*

Be it known that I, WILLIAM J. SUMNER, a citizen of the United States of America, residing at Holyoke, in the county of Hampden 5 and State of Massachusetts, have invented new and useful Improvements in Trolleys for Overhead Tracks, of which the following is a specification.

This invention relates to trolleys for overhead tracks; and it is especially adapted for use in tubular tracks, the object of the invention being to provide a trolley adapted especially to carry heavy loads and so constructed as to permit the portion of the trolley depending below the track to be swung laterally thereto, whereby tackle may be attached to an object to be transported which lies more or less one side of the track without thereby bringing undue weight on the wheels located on one side of the trolley.

A further object of the invention is to improve the construction of the trolley-head located within the track and to provide an improved bearing for the wheels in said head; and still another object in view is to provide a trolley of this character adapted to run without binding around a curve of relatively short radius and to which both the general construction of the trolley and the construction of the improved bearing in the head of the trolley contribute.

The invention is fully illustrated in the accompanying drawings, in which—

Figure 1 is a side elevation of a trolley construction embodying this invention; and Fig. 2 is an enlarged vertical section on line 2 2, Fig. 1, looking in the direction of the arrows thereon, the track being also shown.

Referring now to the drawings, *a* indicates the track, which is of the tubular type of inverted-U shape, the runways for the trolley-wheels being formed by bending the lower edges of the track inward and into semicircular shape in cross-section, there being a space between these inturned lower edges for the pendant *b* of the head *c*, in which head the bearings are formed for the wheels *d*. As is usual in tracks of this character, wheels *d* are mounted on each side of the head on a common axis, and to the pendant *b* is attached a hook or a ring to which the load is secured. In the form of the trolley shown herein, which, as stated, is adapted to heavy loads, four of these heads are used, one pair being secured to a bar *e* and the other pair to the bar *e'*, and attached centrally of these bars by means of swiveled bolts *f* and *f'* is an equalizing-bar *g*, from the center of which depends a ring *h*, to which the tackle is attached which carries the load. Each of these bars *e* and *e'* is supported on two of the heads by means of bolts *i*, whose axes are at right angles to the axis of the wheels *d* and which lie centrally below the latter, said bolts passing through the pendant *b* of said heads and through the vertically-disposed bolts *j*, located one near each end of said bars *e* and *e'*, the latter being secured on the bolts *j* by means of the nuts *j'*. The bolts *j* pass loosely through the bars *e e'* to the end that each of the heads *c* of the trolley may swing freely on the axis of this bolt, and to the end that this movement may be as free as possible the bolts *j* are provided with ball-bearings, as are also the bolts *f*, which extend through each end of the equalizing-bar *g*, the construction of these bearings being identical throughout and clearly illustrated in section in Fig. 2. This construction consists in counterboring the bolt-hole through the bar *e*, for example, to receive a hard-metal disk *k*, having an annular groove therein serving as a track for the balls *m*, and a second disk *o*, also having a groove therein to fit the balls, the nut *j''* being turned up to bear against the disk *o* to hold it in proper relation to the disk *k* to permit the free oscillation of the constriction on the balls *m*, the nut *j''* of course supporting the entire load at one end of the bar *e*. The construction of this ball-bearing *per se* of course is old and forms no part of the invention and will be claimed herein only as one of several elements in combination.

Referring now to Fig. 2, the particular construction of the head *c* will be described. As shown in said figure, the head *c* is perforated transversely to receive two hubs $d'$, formed on the inside of each of the wheels $d$, each hub extending half-way through the head and having its outer surface turned up true. Each hub is then axially bored out from the end thereof toward the outer surface of the wheel, but not through that surface, and in these perforations is a loose axle $p$. This axle may be termed an "axle" only for purposes of convenience, for it is not, in effect, an axle; but it serves as a centering axle-pin for the two wheels in connection with the bearing-rollers $q$, which are disposed circumferentially around and extend over both the hubs $d'$, as shown. This axle $p$ also serves to separate the wheels to prevent the inner ends of the hubs from coming into contact one with the other and to prevent also the inner surfaces of the wheels $d$ from running in contact with the two sides of the head. If desired, a washer (indicated by the double line $r$ at each end of the axle $p$) may be interposed between the ends of the latter and the bottom of the holes drilled in the wheels. This construction provides for a bearing of great rigidity and maximum length and also permits the free rotation of one wheel relative to the other, both having, however, a common axis, and by means of the axially-disposed axle-pin $p$ and the bearing-rolls $q$, which extend across both hubs $d'$, the strains are very evenly distributed throughout and a relatively cheap mode of construction is provided, as well as one in which the outer surfaces of the wheels may be made perfectly smooth and free from projections, such as are necessitated when the end of the axle extends through the wheels. Furthermore, the construction of the bearing in the head $c$ greatly facilitates the assembling of the parts, it being necessary to locate the hub of one wheel in the hole bored through the head, then insert the bearing-rollers $q$, drop the axle-pin $p$ into the hole in the hub, and fit the other wheel over the end of the pin. Obviously the bearing-rolls $q$ might be omitted and the hubs of the wheels be turned to fit the perforation through the head $c$ without sacrifice of any of the essential features of the novelty of the bearing; but the preferred construction is that shown and described herein.

It is seen from the foregoing description that even though it should be necessary to attach a heavy load to the trolley when the latter happens to be located at some point where the track makes a relatively short turn and though the load should lie one side of the track instead of directly under it this construction will permit this to be done without cramping any of the parts or track, whereas as heretofore constructed it has been practically impossible to do this without wrenching severely both the trolley and the track in which it runs.

It is obvious that for light loads two of the heads $d$ can be used, arranged relative to a bar, as $e$ or $e'$, and the hook or ring $h$ be secured to the bolt $j$.

Having thus described my invention, what I claim, and desire to secure by Letters Patent of the United States, is—

1. A trolley for overhead tracks comprising a head having a horizontal perforation therethrough, suitable wheels, hubs on the contiguous sides of the wheels each extending into said perforation, and an axle extending centrally of said wheels from the inner ends of the hubs toward the outer sides of the wheels, and arranged to limit the movement of the wheels toward each other, and to permit movement thereof in the opposite direction, the ends of the axle not extending beyond the plane of the outer surface of the wheels.

2. The combination with an overhead tubular track, of a head located therein provided with a transverse perforation, wheels for the track, and inwardly-projecting hubs on each wheel extending from each side of the head into the perforation therein, said hubs having axially-disposed sockets, and a pin in said sockets whereby the ends of the hubs may be held out of contact with each other.

3. A trolley for overhead tracks comprising a head, wheels having a bearing in said head and running on the track, a pendant on the head extending below the track; a load-carrying member, as a bolt $j$, supported on said pendant, and a bolt, whose axis is at right angles to the axis of the trolley-wheels, passing through said pendant and load-supporting member, whereby the latter may swing sidewise relative to the line of the track.

4. A trolley for overhead tracks comprising a pair of heads, wheels having a bearing in said head, a pendant on each head extending below the track, a bar parallel with the track, rotatable bolts extending through the bar, and means to pivotally attach said bolts one to each pendant to swing in a plane transversely of the track, together with balls located between the heads of said bolts and said bar.

5. A trolley for overhead tracks consisting of two pairs of heads, each provided with wheels mounted therein, a bar parallel with the track and supported on pendants extending from said heads, a suitable connection between said bar and said pendants, said connections being loose in the bars and adapted to swing on the pendants at right angles to the track, an equalizing-bar extending from one of said first-named bars to the other, parallel therewith, and in the same vertical plane, an axially-rotatable bolt extending through said equalizing-bar near each end thereof and supported on said first-named bars.

6. A trolley for overhead tracks consisting of a plurality of heads, wheels for said heads, a bar provided with means for attaching a load thereto, and a jointed pendant extending from the head to said bar whereby the latter may swing transversely of the track independently of the heads.

7. A trolley for overhead tracks consisting of a plurality of heads, wheels for said heads, a bar provided with means for attaching a load thereto, means of connection between said bar and said heads whereby the bar may swing transversely of the track, and whereby said heads may rotate on a vertical axis relative to the bar.

8. A trolley for overhead tracks consisting of a wheel-supported head and a jointed pendant connected with the head and extending below the track, said pendant being capable of swinging transversely of the track and independently of the head.

WILLIAM J. SUMNER.

Witnesses:
K. I. CLEMONS,
WM. H. CHAPIN.